(12) United States Patent
Councill et al.

(10) Patent No.: US 11,928,128 B2
(45) Date of Patent: *Mar. 12, 2024

(54) CONSTRUCTION OF A META-DATABASE FROM AUTONOMOUSLY SCANNED DISPARATE AND HETEROGENEOUS SOURCES

(71) Applicant: Truist Bank, Charlotte, NC (US)

(72) Inventors: Peter Councill, Richmond, VA (US); Kenneth William Cluff, Powhatan, VA (US); Glenn Thomas Nofsinger, Reva, VA (US); James Xu, Raleigh, NC (US); Qing Li, Cary, NC (US)

(73) Assignee: Truist Bank, Charlotte, NC (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/663,107

(22) Filed: May 12, 2022

(65) Prior Publication Data
US 2023/0367787 A1 Nov. 16, 2023

(51) Int. Cl.
*G06F 16/27* (2019.01)
(52) U.S. Cl.
CPC ................. *G06F 16/27* (2019.01)
(58) Field of Classification Search
CPC ...................................... G06F 16/27
See application file for complete search history.

(56) References Cited

U.S. PATENT DOCUMENTS

| | | | |
|---|---|---|---|
| 6,865,567 B1 * | 3/2005 | Oommen | G06F 16/24542 |
| 8,046,749 B1 * | 10/2011 | Owen | G06F 17/18 |
| | | | 717/102 |
| 9,904,579 B2 | 2/2018 | Shear | |
| 10,664,381 B2 | 5/2020 | Walters | |
| 10,884,894 B2 | 1/2021 | Walters | |
| 2009/0240366 A1 * | 9/2009 | Kaushal | G06N 20/00 |
| | | | 700/110 |
| 2010/0138026 A1 * | 6/2010 | Kaushal | G06N 5/04 |
| | | | 706/23 |

(Continued)

*Primary Examiner* — Merilyn P Nguyen
(74) *Attorney, Agent, or Firm* — Michael A. Springs, Esq.; Shumaker, Loop & Kendrick, LLP; Patrick B. Horne

(57) ABSTRACT

A system for maintaining a meta-database including meta-data representing decentralized data from source databases, which cause inefficient selection of modeling data and/or variables. Each of source and meta-data interfaces communicate with the respective database(s). A key variable repository module operably couples the databases and includes an AI program with a scanner algorithm and a profiler algorithm. The scanner algorithm receives the source data from the source interface, compresses the data, and synchronizes the data with the meta-data using the meta-database interface. The profiler algorithm receives the meta-data from the meta-database interface, generates granular data types for the meta-data, determines variables indicative of the meta-data, generates variable probability distributions, produces variable associations, and modifies the meta-database to include the probability distributions and associations using the meta-data interface. The key interface allows for searching the meta-database for variables, variable probability distributions, and/or variable associations to more efficiency select modeling data and/or variables.

20 Claims, 8 Drawing Sheets

(56) References Cited

U.S. PATENT DOCUMENTS

| | | | |
|---|---|---|---|
| 2011/0131162 A1* | 6/2011 | Kaushal | G05B 13/0265 |
| | | | 706/13 |
| 2013/0311517 A1* | 11/2013 | Kementsietsidis | |
| | | | G06F 16/9024 |
| | | | 707/E17.011 |
| 2015/0379430 A1* | 12/2015 | Dirac | G06N 20/00 |
| | | | 706/12 |
| 2016/0034305 A1 | 2/2016 | Shear | |
| 2018/0011739 A1* | 1/2018 | Pothula | G06Q 10/0631 |
| 2019/0303434 A1* | 10/2019 | Methner | G06F 40/18 |
| 2020/0012657 A1 | 1/2020 | Walters | |
| 2020/0012902 A1 | 1/2020 | Walters | |
| 2020/0250071 A1 | 8/2020 | Walters | |
| 2021/0081261 A1 | 3/2021 | Walters | |
| 2021/0200745 A1* | 7/2021 | Bui | G06F 16/215 |
| 2021/0248496 A1* | 8/2021 | Verhoeven | G06N 5/04 |
| 2023/0177024 A1 | 6/2023 | Anand | |

* cited by examiner

CONSTRUCTION OF A META-DATABASE FROM AUTONOMOUSLY SCANNED DISPARATE AND HETEROGENEOUS SOURCES

FIELD

This invention relates generally to the field of data science, and more particularly embodiments of the invention relate to the construction, maintenance, and use of a meta-database to identify variables, distributions, and casualty of the data included in separate or distinct sources.

BACKGROUND

AI systems, algorithms, statistical models and the like can generally be used to predict a subsequent outcome based on previous events. For instance, data representing or associated with various events (e.g., events already taken place) may be fed into an AI system, and the AI system may be configured to determine a characteristic with respect to a subsequent outcome. AI systems are typically utilized to model data including a large number of parameters, values, and the like. In many situations, a larger amount of data relevant to the subsequent outcome may increase the accuracy of a generated output from the AI system. Further, AI systems may provide particular benefit when it is unknown which values within a large amount of data are relevant or most relevant to determining a characteristic of the subsequent outcome. Some AI algorithms include machine learning, in which the AI algorithm may alter internal parameters based on training data in order to increase fidelity with respect to a prediction of a characteristic of a subsequent outcome. Machine learning algorithms are typically more accurate when the data used to train the algorithm includes a large amount of data relevant to the subsequent outcome. Generally, additional input data provided to an AI system is associated with increased processing time, an increase in algorithm training time, greater computing power consumption, and/or a reduction in available processing power for executing other computer-readable instructions.

Improvement in the processing time, training time, and required processing power can typically be realized by reducing the input data or training data provided to the AI system and/or associated algorithm. However, a user may have difficulty identifying important data or variables useful to modeling, and it may be cumbersome to locate recognizable data within extensive storage architectures. Often, data useful for modeling, such as in conjunction with AI algorithms or statistical modeling, is stored in distinct and separate digital locations (e.g., separate databases). Such data is not typically stored or associated with one memory location or programing interface. Thus, it is difficult to ascertain what data is most relevant to producing an accurate inference and/or to accurately train a model. Even knowing what type of data is relevant to an important variable, value, or the like may not alleviate these matters, as the user may not know where all such data is stored when considering voluminous amounts of data, databases, data repositories, and the like.

In view of the circumstances described above, there is a need for a system to help identify key variables and associated data that may reduce processing time and power required for modeling and statistical analysis.

BRIEF SUMMARY

Embodiments of the present invention address the above needs and/or achieve other advantages by providing systems, apparatuses, and methods that produce a meta-database including a summary of data stored across multiple, distinct databases or sources. The meta-database may, via use of an associated key interface, allow a user to search the meta-database during pre-processing to determine variables that are important or critical for modeling and ascertain relationships between types of data stored in the source databases. In various embodiments, the system may include a computer implementing computer instructions including AI algorithms trained to identify important variables, data associated with the variables, and produce associations for the same. Generally, the system may include a program or subprogram to scan source databases and summarize the data within the meta-database. Scanning source databases may include implementing AI instructions in order to initially categorize and group similar sampled data. The system may further include a program or subprogram to profile the meta-data produced in the meta-database during the scanning process. Profiling the meta-data may include implementing AI instructions to identify important variables and associated data in the source databases, generating associations between variables, or generating probability distributions for the identified variables. In some embodiments, AI instructions associated with profiling the meta-data may determine a causal relationship between two or more variables.

Aspects of the present subject matter are directed to a system for maintaining a meta-database representing data from a plurality of source databases. The system includes a computer including one or more processor and at least one of a memory device and a non-transitory storage device. The one or more processor executes a source programing interface, a meta-database programming interface, a key variable repository module, and a key interface. The source programing interface allows for interfacing with the source databases, which include data associated with the variables. The meta-database programing interface allows for interfacing with the meta-database. The key variable repository module operably couples the source databases and the meta-database. The key variable repository module includes an artificial intelligence program including a scanner algorithm and a profiler algorithm. The scanner algorithm includes a number of steps. One step of the scanner algorithm is to communicate with the source programing interface to receive the data of the source databases. Another step of the scanner algorithm is to compress the data of the source databases. Another step of the scanner algorithm is to communicate with the meta-database programing interface and synchronize the meta-database with the compressed data of the source databases. The profiler algorithm also includes a number of steps. One step of the profiler algorithm is to communicate with the meta-database programing interface to receive the data of the meta-database. Another step of the profiler algorithm is to generate, based on the data of the meta-database, granular data types for at least a portion of the data of the meta-database. A further step of the profiler algorithm is to determine a plurality of variables indicative of at least a portion of the data of the meta-database and generate, for each variable, a probability distribution. Another step of the profiler algorithm is to produce at least one association between at least two variables of the plurality of variables. An additional step of the profiler algorithm is to communicate with the meta-database programing interface to modify the meta-database to include the probability distribution generated for each variable and the at least one association produced between the at least two variables. The key interface allows for searching the meta-database for at least one of a variable, a probability distribution for a variable, or a produced association between variables. Furthermore, the meta-database, the key interface, or both improve the efficiency in the selection of at least one of data or variables for modeling.

In another aspect, the present subject matter is directed to a system for maintaining a meta-database representing data from a plurality of source databases. The system includes a computer including one or more processor and at least one of a memory device and a non-transitory storage device. The one or more processor executes a number of artificial intelligence computer-readable instructions. One instruction is to receive data representative of the plurality of source databases. Another instruction is to identify a representative set of data for each database of the plurality of source databases. Each representative set of data substantially represents the data of the respective source database. Another instruction is to generate, in the meta-database, the representative data sets for the plurality of source databases. An additional instruction is to generate granular data types for at least a portion of the data of the meta-database. A further instruction is to determine a plurality of variables indicative of at least a portion of the data of the meta-database. Another instruction is to generate a probability distribution for each variable of the plurality of variables. One instruction includes to produce at least one association between at least two variables of the plurality of variables.

In at least one embodiment, one or more of the steps to identify the representative set of data for each source database, to generate granular data types for at least a portion of the data of the meta-database, to determine the plurality of variables indicative of at least a portion of the data of the meta-database, or to produce at least one association between at least two variables may be included in instructions associated with a machine learning algorithm. In an additional or alternative embodiment, the machine learning algorithm may use a neural network. Additionally or alternatively, the one or more processor may execute instructions to generate, in the meta-database, the probability distribution generated for each variable and the at least one association between the at least two variables.

In an additional or alternative embodiment, the one or more processor may execute instructions to search, based on a user input, the data of the meta-database for at least one variable, probability distributions for at least one variable, or associations between at least two variables. In some embodiments, the one or more processor may execute instructions to search, based on a user input, a subset of the data of the meta-database for at least one variable, probability distributions for at least one variable, or associations between at least two variables. The subset of data may represent a subset of databases of the plurality of source databases. In at least one additional or alternative embodiment, the one or more processor may execute instructions to produce at least one interactive visualization of at least one variable of the plurality of variables, a probability distributions for at least one variable, or an association between at least two variables. Additionally or alternatively, the one or more processor may execute instructions to communicate, based on at least one variable identified by a user, a subset of the plurality of source databases including data relevant to the at least one variable identified by the user.

In an additional or alternative embodiment, the instruction to identify the representative data for each database of the plurality of source databases may include instructions to compress the data represented in each source database of the plurality of source databases. Additionally or alternatively, the instruction to generate, in the meta-database, the representative data for the plurality of source databases includes instructions to synchronize the data of meta-database with the representative data for the plurality of source databases. In some embodiments, the one or more processor may further execute instructions to collect information about the completeness of data relevant to a variable and, when the completeness of the data is less than a predetermined threshold, eliminate the data relevant to the variable from the meta-database.

In an additional or alternative embodiment, the instruction to generate granular data types for at least a portion of the data of the meta-database may include utilizing a field-by-field analysis. Additionally or alternatively, the instruction to generate granular data types for at least a portion of the data of the meta-database may include instructions to analyze properties of the data of the meta-database stored as at least one of integer, floating point, date, or text to detect at least one of categorical variables, binary variables, dates with and without times, timestamps with and without dates, numerically encoded categorical variables, true floating point and integer values, ID numbers, strings, zip codes, phone numbers, or IP addresses. In some embodiments, the instruction to generate a probability distribution for each variable of the plurality of variables may include instructions to apply a function of the granular data type for at least one variable, the function including at least one of a density estimate, discrete distribution, or sample.

Additionally or alternatively, the instruction to produce at least one association between at least two variables may include instructions to determine or estimate a causal relationship between the at least two variables. In some embodiments, the instruction to produce at least one association between at least two variables may include instructions to determine or estimate at least one of a parametric correlation between the at least two variables, a non-parametric correlation between the at least two variables, a Pearson correlation between the at least two variables, a Spearman correlation between the at least two variables, a Kendall's Tau correlation between the at least two variables, mutual information between the at least two variables, or an uncertainty coefficient between the at least two variables.

In some further or alternative embodiments, the meta-database may be stored on a first portion of the at least one of the memory device and the non-transitory storage device, and the plurality of source databases may be stored on a second portion of the at least one of a memory device and a non-transitory storage device. Furthermore, the first portion may be allocated to substantially less memory space of the at least one of the memory device and the non-transitory storage device than the second portion.

In another aspect, the present subject matter is directed to a for maintaining a meta-database representing a plurality of source databases. The method includes communicating, from a source programing interface, data representative of a plurality of source databases to an artificial intelligence program. The method further includes compressing the data representative of the plurality of source databases. Further, the method includes communicating, to a meta-database programing interface, the compressed data and synchronizing the data of the meta-database with the compressed data. The method also includes generating, utilizing the artificial intelligence program, granular data types for at least a portion of the data of the meta-database. Further, the method includes determining, utilizing the artificial intelligence program, a plurality of variables indicative of at least a portion of the data of the meta-database. The method further includes generating, utilizing the artificial intelligence program, a probability distribution for each variable of the plurality of variables. The method additionally includes producing, utilizing the artificial intelligence program, at least one association between at least two variables of the plurality of variables. Furthermore, the method includes communicating, to the meta-database programing interface, the compressed data and modifying the meta-database to include the probability distribution generated for each variable and the at least one association produced between the at least two variables.

In one embodiment, the method may further include determining, utilizing the artificial intelligence program and the plurality of source databases, that at least a portion of the data of the meta-database is outdated.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
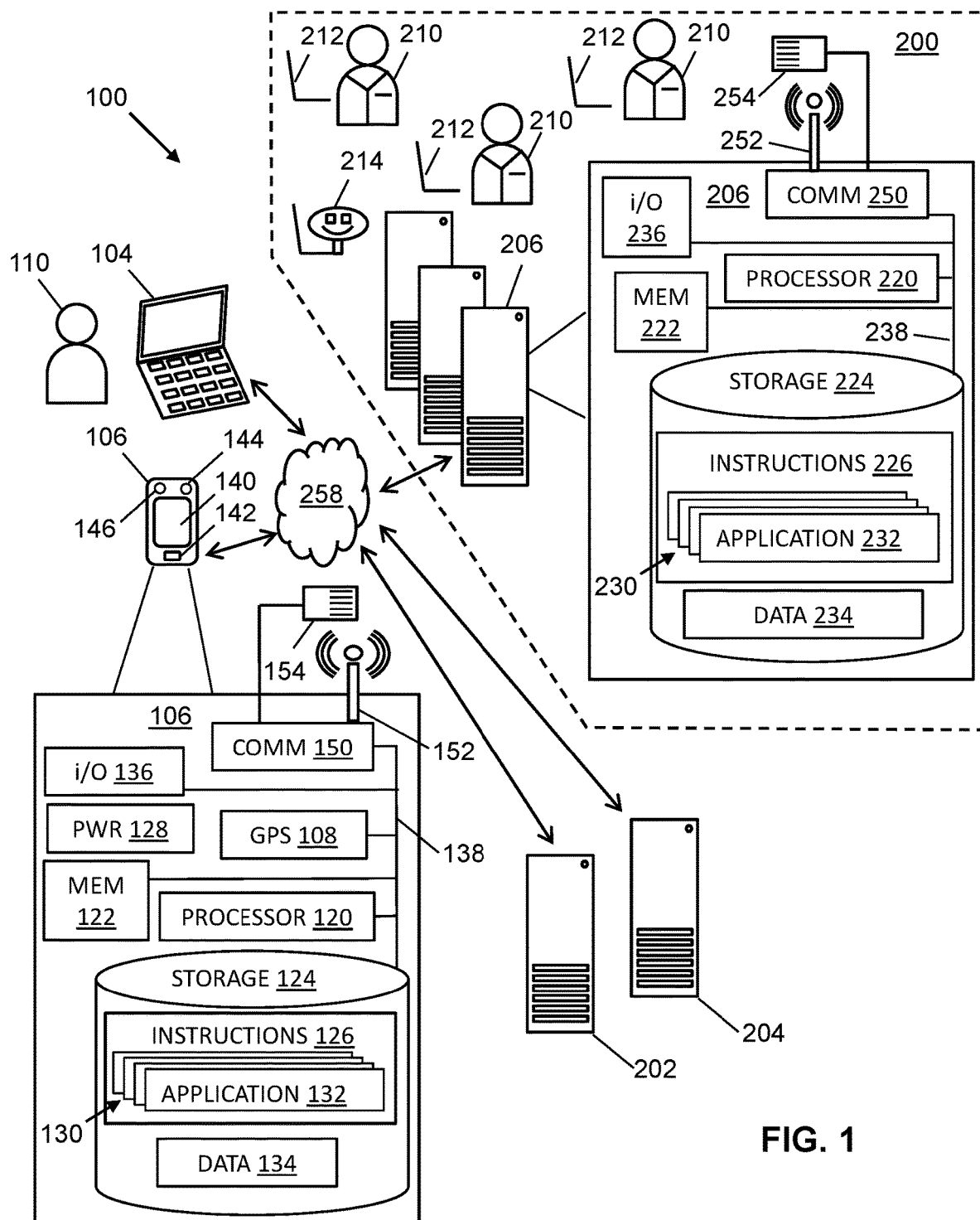

Having thus described embodiments of the invention in general terms, reference will now be made to the accompanying drawings, wherein:

FIG. 1 illustrates an enterprise system, and environment thereof, according to at least one embodiment.

Figure 2A:
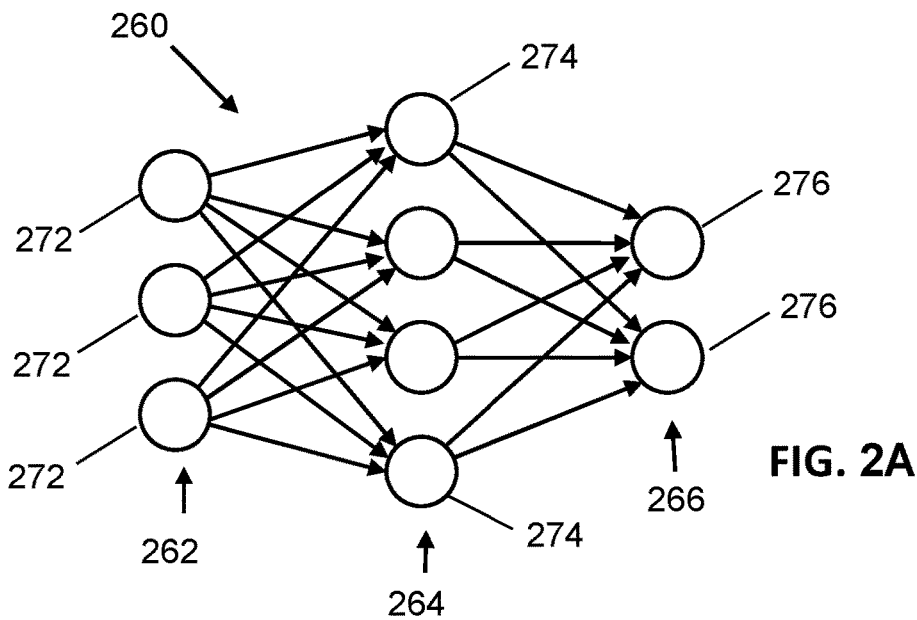

FIG. 2A is a diagram of a feedforward network, according to at least one embodiment, utilized in machine learning.

Figure 2B:
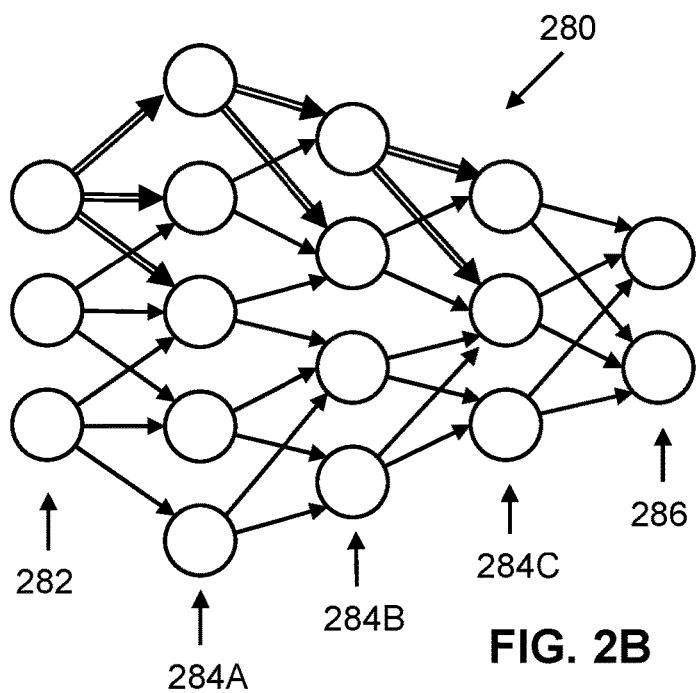

FIG. 2B is a diagram of a convolution neural network, according to at least one embodiment, utilized in machine learning.

Figure 2C:
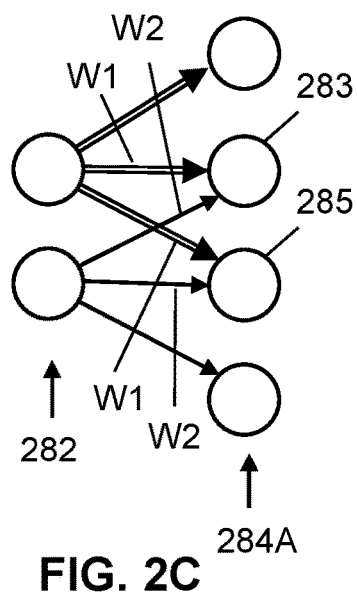

FIG. 2C is a diagram of a portion of the convolution neural network of FIG. 2B, according to at least one embodiment, illustrating assigned weights at connections or neurons.

Figure 3:
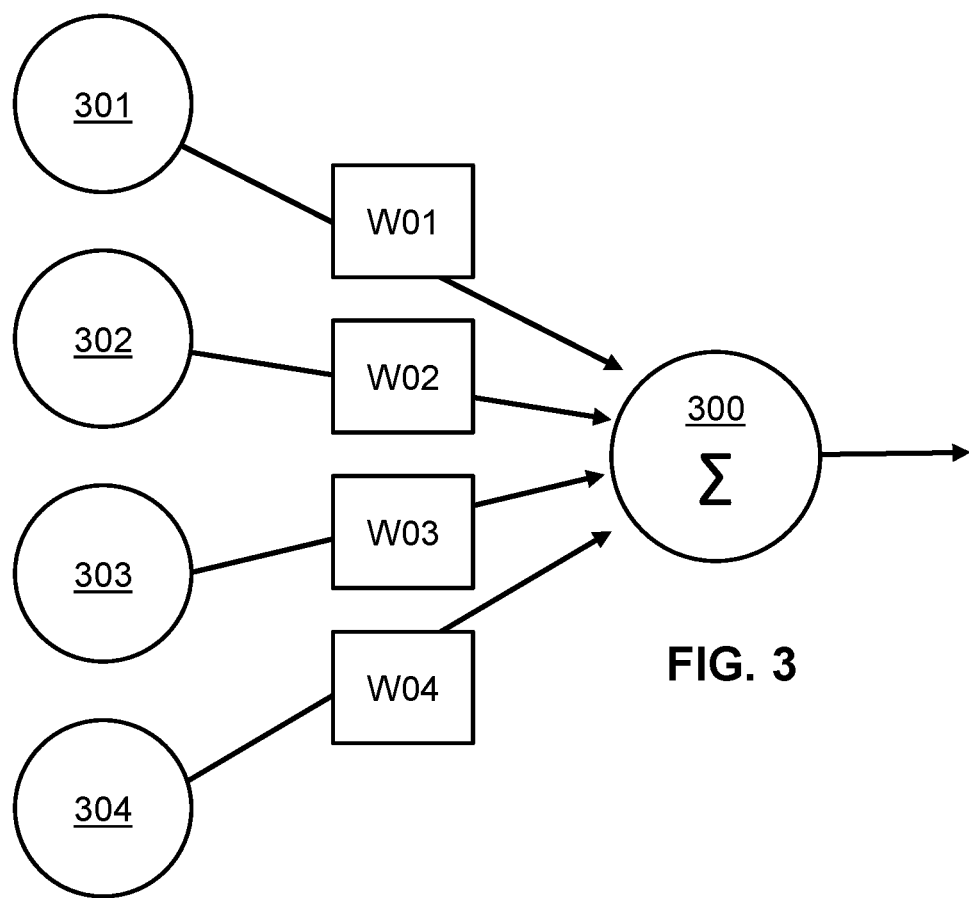

FIG. 3 is a diagram representing an exemplary weighted sum computation in a node in an artificial neural network.

Figure 4:
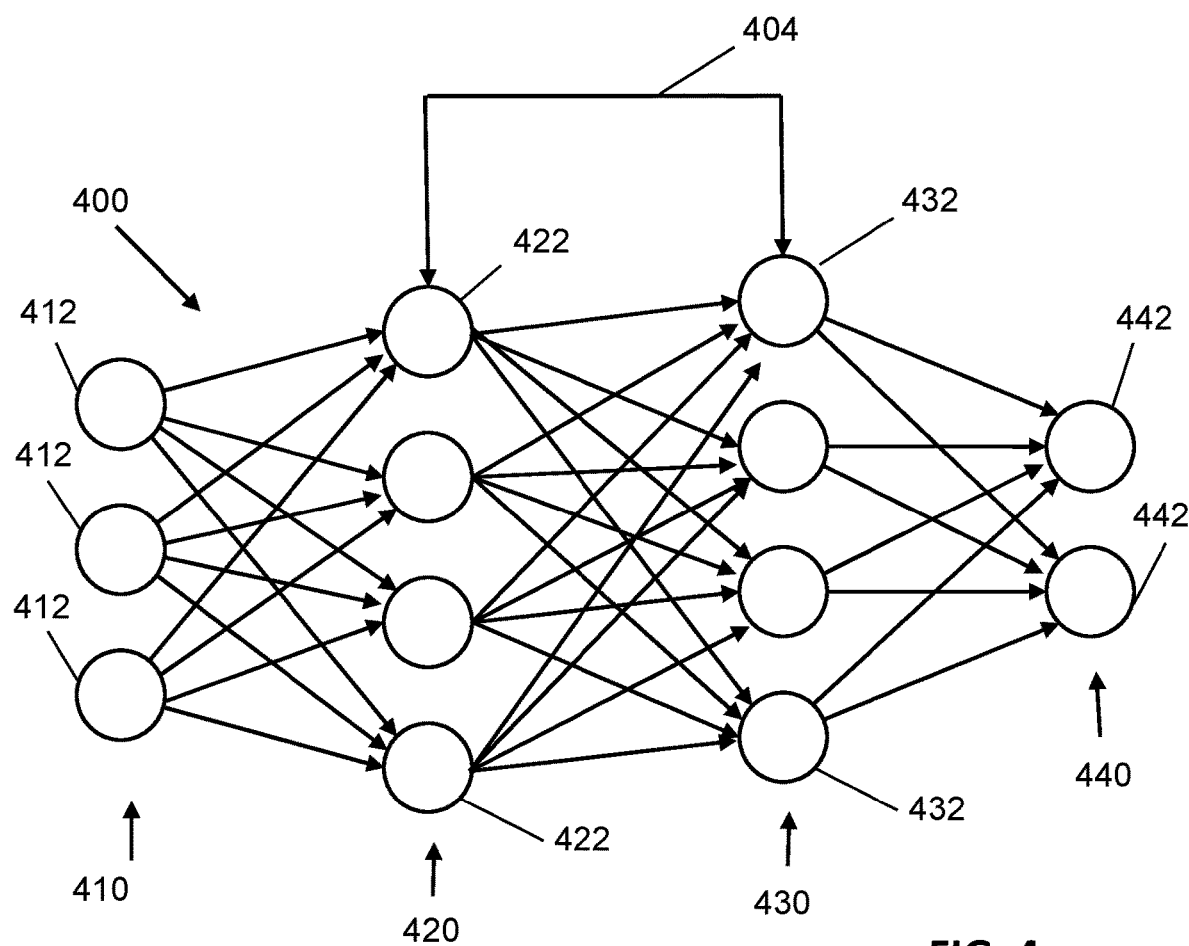

FIG. 4 is a diagram of a Recurrent Neural Network RNN, according to at least one embodiment, utilized in machine learning.

Figure 5:
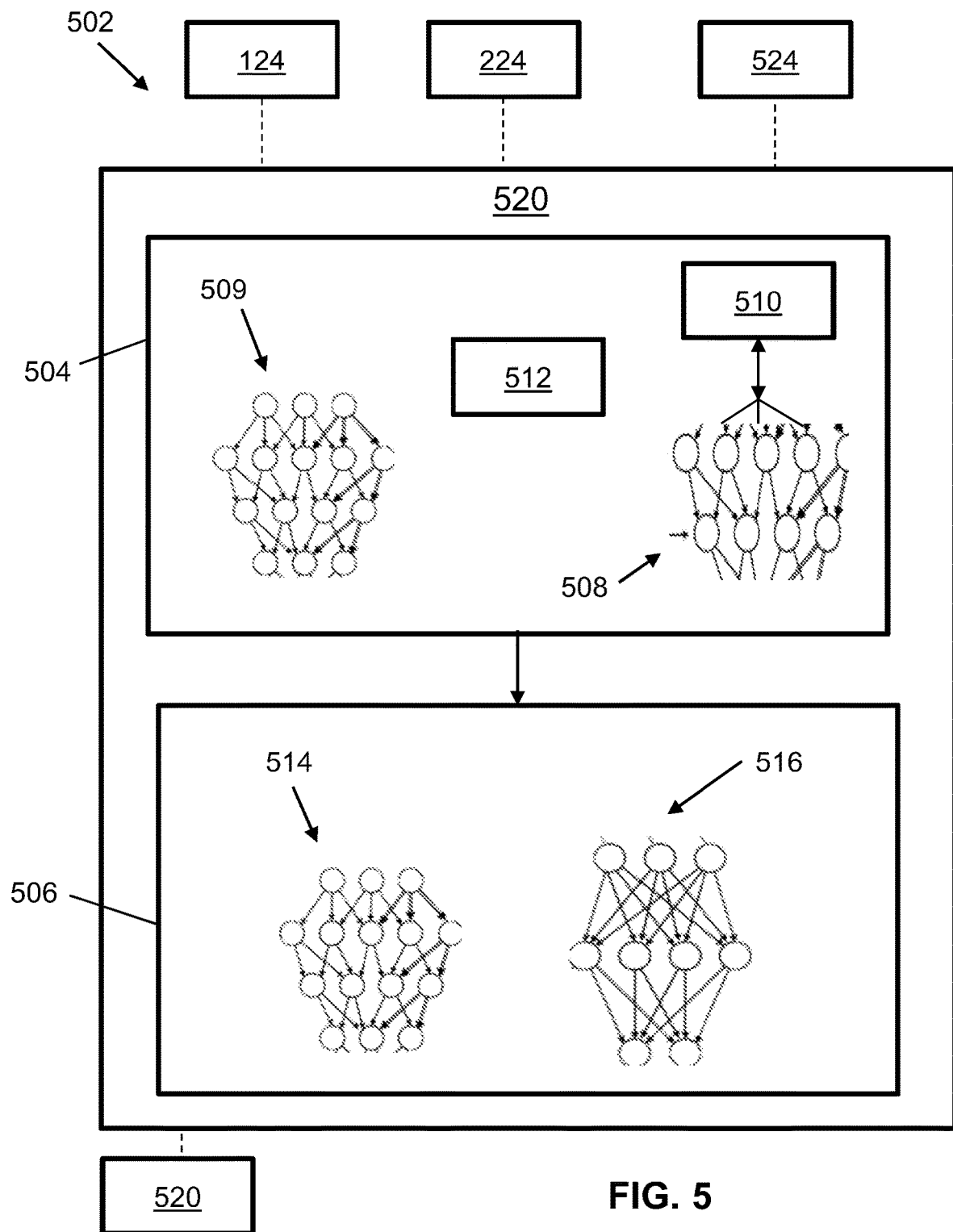

FIG. 5 is a schematic logic diagram of an artificial intelligence program including a front-end and a back-end algorithm.

Figure 6:
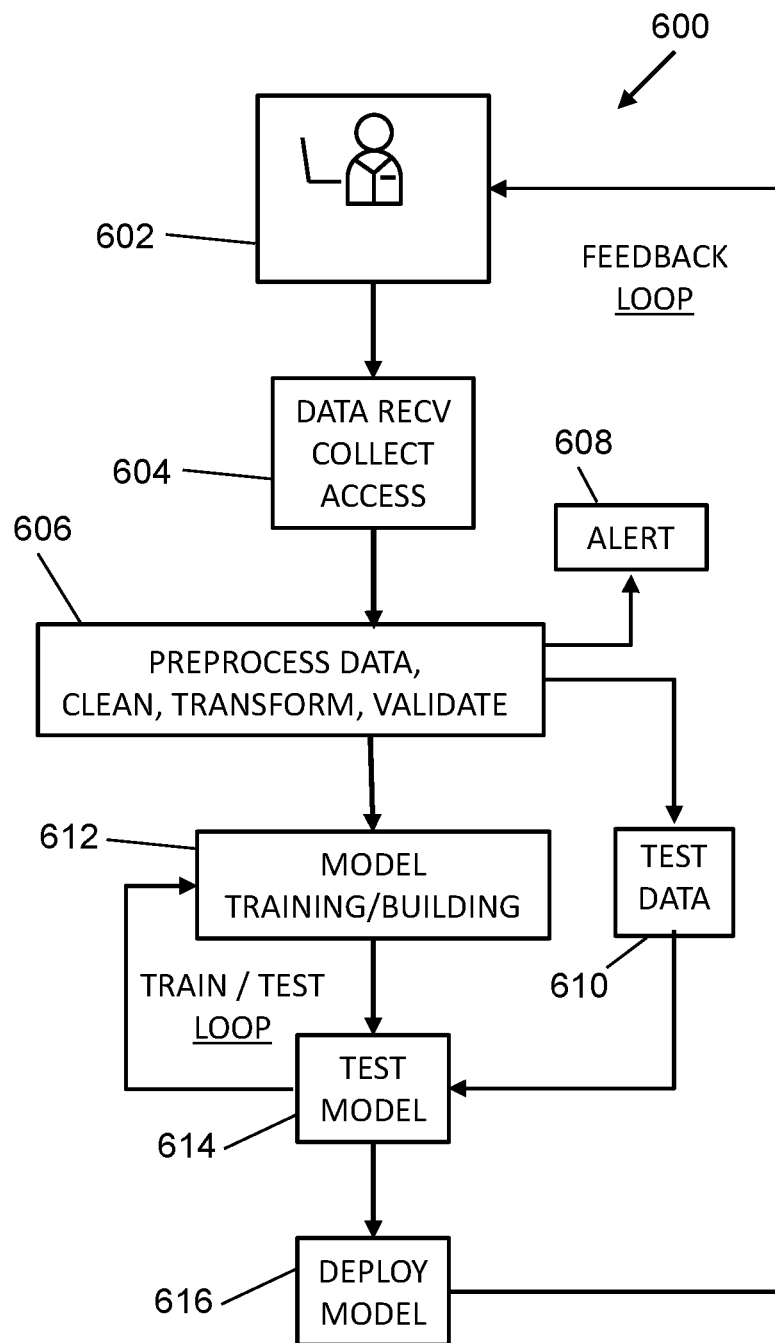

FIG. 6 is a flow chart representing a method, according to at least one embodiment, of model development and deployment by machine learning.

Figure 7:
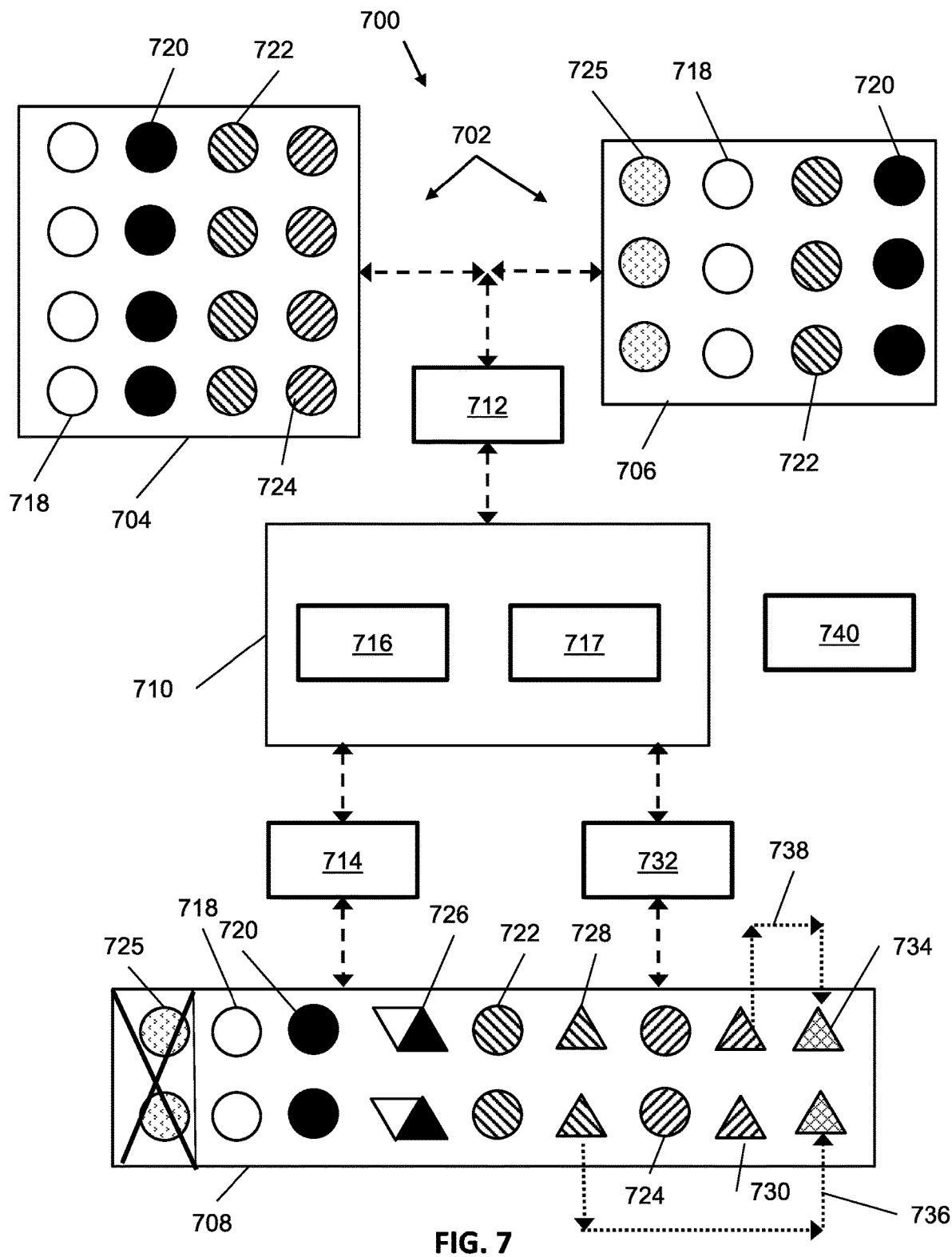

FIG. 7 illustrates one embodiment of a system for maintaining a meta-database representing data from multiple source databases, in accordance with aspects of the present subject matter.

Figure 8:
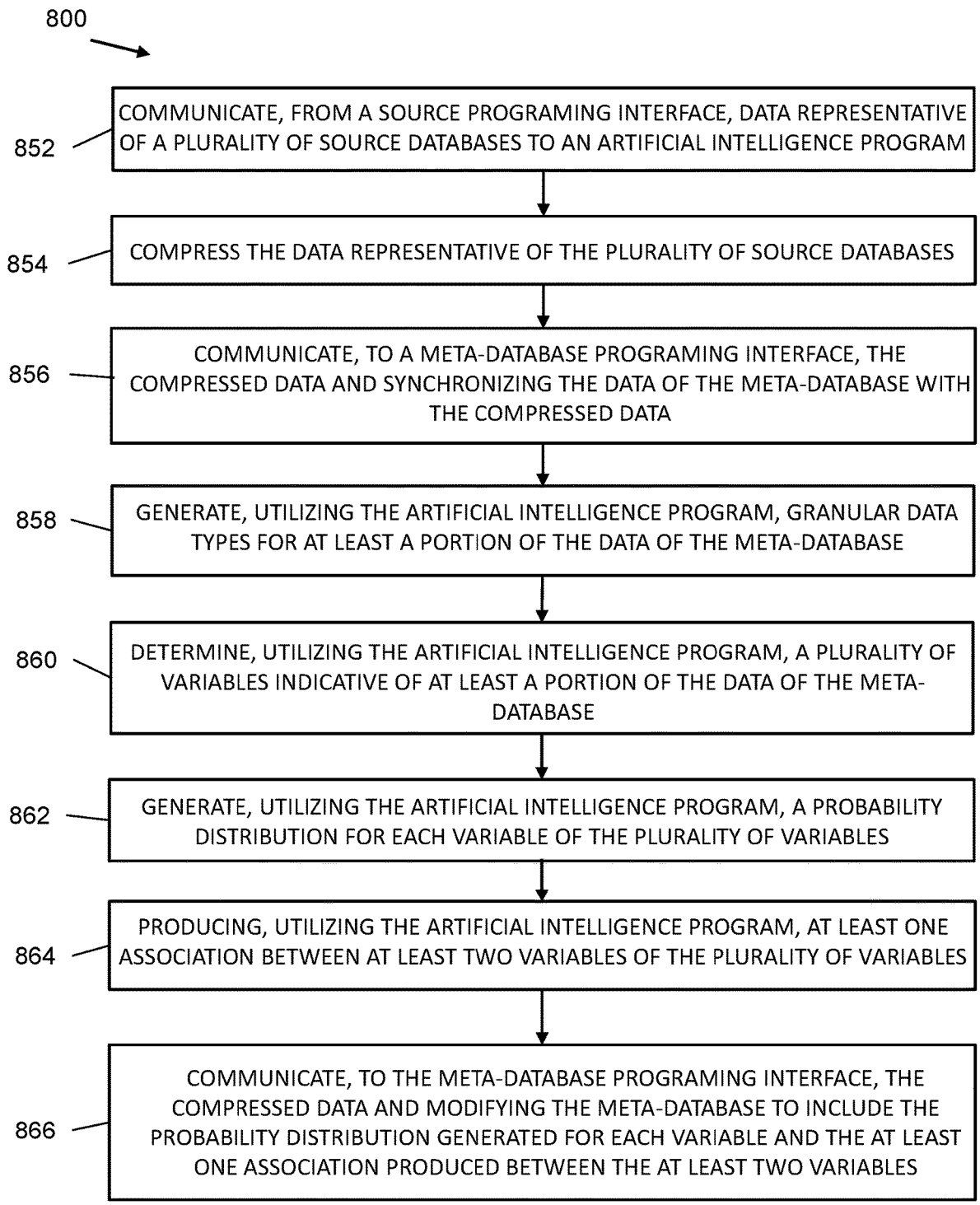

FIG. 8 illustrates one embodiment of a method for maintaining a meta-database representing data from multiple source databases, in accordance with aspects of the present subject matter.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s) —with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence engine (e.g., an artificial intelligence system, artificial intelligence algorithm, artificial intelligence module, program, and the like) generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence engine may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topology, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 504 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

With reference to the general architecture, features, and function of AI engines as described above, such as neural networks and other machine learning algorithms, the present subject matter is also directed to applications for creating, maintaining, and utilizing a meta-database formed from data stored in multiple, separate, or distinct source databases. Generally, the meta-database and/or associated hardware and software allow for a user to efficiently determine parameters useful for modeling from the source databases. It should be appreciated that, in various embodiments disclosed herein, a user may be able to ascertain such parameters and which databases of the source databases include data relevant to such parameters without directly opening or interfacing with the source databases. In some embodiments, the parameters determined from the meta-database may be particularly suitable to efficiently utilize an AI model (e.g., generating an inference from an AI algorithm) and/or to more efficiently train the AI model.

In an exemplary embodiment and as illustrated schematically with reference to FIG. 7, a system architecture 700 is generally suitable to initially generate and/or subsequently maintain a meta-database 708 representing data from a plurality of source databases 702. In the embodiment of FIG. 7, two databases (i.e., first database 704 and second database 706) are illustrated for the purposes of ease of discussion. However, it should be appreciated that the system 700 may be configured to interface with any number of additional source databases 702. Particularly, several embodiments herein may be utilized with a large number of source databases 702, such as hundreds, thousands, tens-of-thousands, or more.

Furthermore, the size, aspect ratio, number of circles (indicating one or more data points or database elements) in the source databases 702 generally represent the amount of data stored in the respective source databases 702 and the configuration of such data. For instance and as illustrated, a size of the schematic box associated with the first database 702 is larger than a size of the box associated with the second source database 706. However, it should be appreciated that the source databases 702 may include more than the illustrated, exemplary data. Particularly, the one or more of the source databases 702 may include voluminous amounts of data that may be useful for modeling purposes. Additionally or alternatively, the source databases 702 may be designated by an administrator of the system 700. In some embodiments, a user of the system 700 may add one or more additional databases or remove one or more administrator selected databases from the source databases 702. In some embodiments, all of the source databases 702 may be selected by a user of the system 700.

The system 700 may include a source programing interface 712 for interfacing with the source databases 702. The source databases 702 generally include data representing a number of variables (some of which are useful for modeling, statistical analysis, or the like for both general and for particular applications). The meta-database programing interface 714 allows for interfacing with the meta-database 708. A key variable repository module (KVR module 710) operably couples the source databases and the meta-database. For example, source data from the source databases 702 may be communicated to the KVR module 710, and the KVR module 710 may generate data or update corresponding data in the meta-database 708. The KVR module 710 may generally include or be associated with one or more AI programs (e.g., a scanner algorithm 716 and profiler algorithm 717). The AI programs may be used to generate the meta-database 708 one or variables, probability distributions for the variables, or associations between the variables. More particularly, the AI programs may be configured to implement a number of AI algorithm instructions (such as a portion of the associated instruction to all of the associated instructions), AI subroutines, and the like as described herein and in more detail below. A key interface 732 allows for searching the meta-database for at least one of a variable, a probability distribution for a variable, or a produced association between variables.

Thus, FIG. 7 illustrates a system architecture of the exemplary system 700 with programs, subprograms, and related or associated programs that are suitable for implementing various of the elements of methods, steps, instructions, and the like discussed herein. However, the following discussion is equally applicable to other suitable configurations of systems. In various embodiments, one or more of the schematic elements may be combined or arranged alternatively. For example, the interface programs 712, 714 and/or the key interface 732 or a portion thereof may be included in the key variable repository module 710 and/or the databases 702, 708. Further, any of the interface 712, 714, 732 may be formed together as a single program or may be arranged as a subsystem or assembly including multiple subroutines, programs, and the like.

As shown in FIG. 7, the meta-database 708 may utilize less storage space than the storage space used to store the source databases 702. This can be realized by comparing the areas of the schematic box associated with the first database 704 and the schematic box associated with the second database 706 with the area of the schematic box associated with meta-database 708. This relationship is further represented by the difference in the number of data-representing circles included in the source databases (28 circles) and the number of data-representing circles included in the meta-database (16 elements, with only 8 data-representing circles equivalent to the data included within the source databases 702). For example and in several embodiments, the meta-database 708 may be stored on a first portion of a memory device(s) and/or a non-transitory storage device(s) associated with the system 700, and the source databases 702 may be stored on a second portion the memory device(s) and/or the non-transitory storage device(s). Furthermore, the first portion (e.g., meta-data) may be allocated to substantially less space of the memory device(s) and/or the non-transitory storage device(s) than space allocated to the second portion (e.g., source data).

For instance, various embodiments of the system 700 may be suitable to summarize source data (e.g., columns and rows of elements, numbers, strings and the like) of a source databases associated with 100s of megabytes (MB) or even gigabytes (GB) into a few MB. Additionally or alternatively, the system 700 may form or maintain the meta-database 708 that summarizes the source data of the source databases 702 (e.g., data associated multiple, individual source databases 702). For example, source data associated with 100s of GB or even terabytes (TB) across a few or numerous source databases 702 may be summarized in 100s of MB.

Thus, the system 700 or components thereof (such as the meta-database 708, the KVR module 710, and/or key interface 732) are able to reduce the amount of data requiring processing and/or consideration for modeling or statically analysis of some or all of the source databases 702 themselves, as explained below with reference to the scanner algorithm 716. Furthermore, embodiments of the system 700 may identify variables particularly suitable for modeling or statistical analysis of the source data, the source databases 702, and/or portions thereof, as explained below with reference to the profiler algorithm 717. As such, the system 700 or components thereof may provide increased efficiency in the selection of data (e.g., one or more source databases 702) or variables (portions of the source database(s) 702, e.g., particular columns of data) for subsequent statistical analysis, modeling, or model training in a future process, represented by schematic block 740. It should be appreciated that the identifying which source databases 702 or portions thereof include data useful for future processing reduces the time required and/or computational power necessary to run the future process 740. In various embodiments, the future process 740 may include a machine learning program, and the identified source databases and/or variables may be input used to producing an inference from the machine learning program and/or train the same, as generally explained herein. Further, a user of the system 700 is not required to download and open the source databases 702 or initially examine the associated data, elements, and the like to determine where useful data for modeling/analysis is located. Thereby, several embodiments disclosed herein may reduce ancillary bandwidth usage in pre-processing and/or selecting input data or databases for future modeling or model training, e.g., in one or more future processes 740.

It should be appreciated that the system 700, meta-database 708, and/or key interface 732 may provide the user(s) a single place or application to determine what useful variables the source databases 702 are associated with and/or if there are conditional relationships or correlations between various variables. For instance and when determine what data to input into a future process 740, e.g., an AI algorithm, a user does not have to theorize or guess the connections between data and what portions of the data may be useful. A user may thereby avoid unnecessarily operating the future process 740 on data that is unlikely to produce accurate or desired results. In many embodiments, determining the ideal source databases 702 or elements thereof for use with the future process 40 may increase the computational speed of the future process, may reduce the computational power required by the future process 40, may increase the accuracy of the output or inference of the future process 40, and/or may increase the computation power available for other processes utilizing processing components shared with the future process 740.

In various embodiments, the meta-database 708 and/or key interface 732 may be processed on one or more servers, processing devices, controllers, and other suitable hardware that is independent from the component(s) utilized to open or interface with the source databases 702. Thus, the risk of a user submitting a bad query, request, instruction, etc. to the programs used in association with the source databases 802 is substantially reduced, thereby also lowering the risk of crashing, slowing down, or otherwise impacting the processing components associated with the source databases 702 and potentially other process of the enterprise system 200, associated systems, or local devices (e.g., the mobile device 104, computing device 106, the agent devices 212, and/or the enterprise computing system 206).

In some embodiments, the KVR module 710, the scanner algorithm 716, and/or the profiler algorithm 717 may be associated with instruction related to one or more a deep neural network, a CNN, a front-end algorithm, a back-end algorithm, statistical models or machine learning programs such as decision tree learning, associate rule learning, recurrent artificial neural networks, support vector machines, and the like as described herein. While exemplary embodiments of suitable AI configurations are discussed below, other embodiments of the KVR module 710, the scanner algorithm 716, and/or the profiler algorithm 717 may include other, suitable configurations of AI programs such as configurations of an AI system similar to the basic feedforward network 260, the RNN 400, the AI program 502, the front-end algorithm 504, and/or the back-end algorithm 506 of FIGS. 2A, 2B, 4, & 5, respectively. It should be appreciated that different AI systems generally suitable to perform the required task of the program and/or instructions thereof may produce more accurate or faster results and/or reduce the processing power required to perform the task (e.g., AI systems generally suitable for data type recognition and summarization may be particularly suitable for use with the scanner algorithm 716, and AI systems generally suitable for categorization of data types, pattern recognition, statistical modeling, and/or determining correlation or causation may be particularly suitable for use with the profiler algorithm 717). As an example, a machine learning algorithm may be utilized in the profiler algorithm 717 to recognize the type of data of each element in the meta-database 708, determine variables, and/or determine associations between variables, as machine learning algorithms can be trained to recognize patterns).

Certain types of AI programs suitable for use with the KVR module 710, the scanner algorithm 716, and/or the profiler algorithm 717 generally require training, e.g., machine learning algorithms, support vector machines, and the like. An exemplary procedure for training a machine learning algorithm for recognizing variables of the meta-database 708 is described below (e.g., a portion of the instructions associated with the profiler algorithm). However, it should be appreciated that a similar procedure may be utilized with respect to training other AI systems to perform the same task, similar tasks, or alternative tasks associated with one or more of the KVR module 710, the scanner algorithm 716, and/or the profiler algorithm 717, as described herein.

The machine learning algorithm may be trained to identify important variables in the meta-database 708, and thus the plurality of databases 702, using real modeling, statistical analysis, and/or the like (e.g., prior identification of variables and data of the plurality of databases for use in the same). In some embodiments, significant and or important variables used for such purposes (e.g., in a previous or historical model) may be identified as correct or favorable variable candidates for the purposes of training the machine learning algorithm. If the variables were not useful or not used in the previous model, such variables may be identified as incorrect or unfavorable variable candidates for the purposes of training the machine learning algorithm. Furthermore, the input for training the machine learning algorithm can include a version, historical record, or the like of the source databases 702 or a portion thereof. It should be appreciated that version of the source databases 702 may be the same as used when producing the previous model or an approximation of the same (e.g., a version of the source databases 702 or a portion thereof at approximately the same time and/or including substantially the same data). The version of the source databases 702 used for training the machine learning algorithm may be supplemented with additional data needed to perform supervised learning. Supervised learning is a machine learning training approach that is defined by its use of labeled datasets. These datasets are designed to train or "supervise" algorithms into classifying data or predicting outcomes accurately. Using labeled inputs and outputs, the machine learning algorithm can measure its accuracy and learn over time. Both satisfactory and unsatisfactory outcome examples may be included in training, as the machine learning algorithm learns from both types of scenarios. Furthermore, ongoing training may be periodically performed on the machine learning algorithm using new or additional examples, such as user provided feedback (positive and/or negative) with respect to inferences (i.e., variables determined from the meta-database) during use. Thus, periodic ongoing training can further improve the efficiency and effectiveness of the machine learning algorithm for user interaction.

In some embodiments, at least a portion of the system 700 and/or the KVR module 710 may be implemented on the processing device 120, the processing device 220, the AI processor 520, and/or one or more dedicated processing device or processing devices associated with the system 700. In some embodiments, various instructions associated with the KVR module 710, such as the scanner algorithm 716 and/or the profiler algorithm 717 may be implemented on the AI processor 520, and/or one or more dedicated processing device or processing devices associated with the system 700. In various embodiments, instructions associated with the system 700 and/or components or subprograms thereof may be stored in an associated memory device and/or storage device of the system (e.g., memory device 124 and/or memory device 224) communicatively coupled to the associated processor(s). Additionally or alternatively, the system 700 may include one or more memory devices and/or storage devices for processing use and/or including one or more instructions necessary for operation of the system 700, the KVR module 710, the scanner algorithm 716, and/or the profiler algorithm 717.

Referring now to FIG. 8, an exemplary embodiment of a method 800 is illustrated for maintaining a meta-database representing a plurality of source databases. Maintaining, as used herein and in reference to a meta-database, includes the initial creation of unless otherwise specified. The method 800 may be utilized with the system 700, similarly, or suitably configured systems to generate the meta-database 708 or an equivalent centralized repository for the storage of such data. In various embodiments, the method 800 may include elements, steps, instructions, etc. that are associated with one or more AI algorithms. For instance, method elements generally associated with tasks suitable for one or more machine learning algorithms (e.g., identifying representative data from the source database(s), generating granular data types for at least a portion of the data of the meta-database, determining variables indicative of the data and/or a portion the data of the meta-database, and/or producing an association between variables) may be included in the instructions of programs and subprograms corresponding to such tasks in the system architecture, e.g., the schematic logic flow for the corresponding system. In some embodiments and also in reference to FIG. 7, such method elements associated with the AI algorithm(s) may correspond to instructions for one or more of the KVR module 710, the scanner algorithm 716, and/or the profiler algorithm 717. However, the method 800 of FIG. 8 is equally applicable to other system architectures capable, suitable, etc. of performing or executing such method elements.

As shown in FIG. 8, the method may include (method element 852) communicating, from a source programing interface, data representative of a plurality of source databases to an artificial intelligence program. With reference also to exemplary system 700 of FIG. 7, the source programing interface 712 may include one or more subprograms and/or be associated with instructions allowing the KVR module 710 to communicate with each of the source database 102. For instance, the source programing interface 712 may include one or more drivers suitable or capable of interfacing with each application and/or storage format of the respective source database 702. It should be appreciated that as used here, and without, the data representative of the source databases 702, compressed data, and meta-data as well as variables, parameters, and the like produced from the meta-data may include information relative to, be associated with, or somehow linked to the source database(s) 702 containing the original data. For example, if the system 700 indicates that source data 720 is useful as input to the future process 740, information associated with identifying at least the first database 704, the second database 706, and the position of source data 720 within the respective databases 704, 706 may be provided to the user and/or stored with such elements of the meta-database 708 (e.g., database element location information may generally be propagated with the individual data points throughout various transformation, manipulations, and the like described herein).

Method element 854 may include compressing the data representative of the plurality of source databases. In one embodiment, the scanner algorithm 716 may include one or more subprograms and/or be associated with instructions allowing the scanner algorithm 716 to identify a representative set of data for each database (e.g., first database 704 and second database 706) of the source databases 702. Thus, compressing the data of the source databases, as used herein, may generally include summarizing the data of the source databases 702 by identifying a subset of data points that will be recorded in the meta-database 708. The subset of data produced in the meta-database 708 generally or substantially represents the data of each respective source database (e.g., first and second databases 704 and 706).

Compressing the data of the source databases 702 and/or the scanner algorithm 716 may be associated with instructions to initially oversample data from each of the source databases 702. For instance, data may be sampled from each of the source databases 702 from all applicable time periods represented within the source databases 702. Once the data has been sampled, the scanner algorithm 716 may be configured to establish scanning categoricals and organize the oversampled input data into the respective scanning categoricals including similar data. For instance, the scanning algorithm may place data including similar significant features within an associated scanning categorical. For instance, individual scanning categoricals may include numbers within significant ranges (e.g., 0-10, 10-20), numbers with having a significant number of digits (e.g., numbers capable of being telephone numbers, numbers that may represent money with two significant figures following a decimal point such as 500.00, numbers suitable for time stamps, etc.), numbers and/or character strings having features associated identification indicators (e.g., strings with numbers and letters, dashes, internal divisions, etc.), strings including digital communication characteristics (e.g., strings including ".com," ".net," "@," etc.), and the like.

In various embodiments, the scanning algorithm 716 may utilize an AI program(s) in order to establish some or all of the scanning categoricals of the scanner algorithm 716 and/or sort the oversampled data into the appropriate scanning categoricals (e.g., categoricals determined by the AI program, categoricals determined by the administrator of the system 700, and/or categoricals received as input from a user of the key interface 732). Suitable AI programs for use with the scanner algorithm 716 may include one or more machine learning programs, neural networks, CNNs, support vector algorithms, deep neural networks, decision tree learning, associate rule learning, or AI programs capable of establishing some or all of the scanning categoricals of the scanner algorithm 716 and/or sort the oversampled data into the appropriate scanning categoricals. In some embodiments, the input data from the source database may sampled (e.g., oversampled) numerous times, such as 5 or more, 10 or more, or 20 or more times. The scanning algorithm 716 and/or an AI program thereof may be configured to form the compressed data from each of the individual samples. For example, numbers suitable to averaging may be averages, a representative element may be chosen for strings, etc.

In some embodiments, system 700 may be configured to run the scanner algorithm 716 autonomously or semi-autonomously. For instance, when a time since the system 700 has implemented the scanner algorithm 716 at least one of the source databases 702 is greater than a predetermined update interval, the system 700 automatically run the scanner algorithm. Additionally or alternatively, a user of the key interface 732 may communicate a signal or cause a signal to be communicated which deploys the scanner algorithm 716.

Referring still to the embodiment of FIG. 8, and for some embodiments FIG. 7, method element 856 may include communicating, to a meta-database programing interface, the compressed data and synchronizing the data of the meta-database with the compressed data. For example, the meta-database programing interface 714 may include one or more subprograms and/or be associated with instructions allowing the KVR module 710 and/or the meta-database programing interface 714 to communicate with the meta-database 708. For instance, the meta-database programing interface 714 may include one or more drivers suitable or capable of interfacing with the application and/or storage format of the meta-database 708 such that the meta-database programing interface 714 generates the compressed data and/or data representative of the source databases 702. Such compressed data may generally be determined and communicated from the scanner algorithm 716. Generally, synchronizing data of the meta-database (meta-data) with the compressed data may include adding newly discovered database elements, removing old meta-data from the previous operation of the scanner algorithm associated with elements now missing from the associated source database(s) 702. In some embodiment, the meta-database programing interface 714 and/or scanner algorithm 716 may designate or otherwise flag significant changes to previously identified elements and/or meta-data. In some embodiments, the meta-database programing interface 714 and/or meta-database 708 may include or be associated with a Python script or the like, which allows user and administrator web and server functionality.

The method may include generating, utilizing the artificial intelligence program, granular data types for at least a portion of the data of the meta-database (e.g., method element 858). As illustrated with reference to the example of FIG. 7, the profiler algorithm 717 may include one or more subprograms and/or be associated with instructions allowing the profiler algorithm 717 to generate, based on the meta-data, granular data types for at least a portion of the meta-data. Generally, the profiler algorithm 717 may communicate with the meta-database programing interface 714 to receive the data of the meta-database 708 for subsequent processing. Thus, the system 700 allows for the scanner algorithm 716 that generates meta-data and the profiler algorithm 717 that analyzes the meta-database 708 to be ran sequentially and/or at the option of the administrator or user. Thus, instructions that require substantial processing power (e.g., any steps requiring AI programming) may be scheduled for implementation at times that are convenient. In some embodiments, the scanner algorithm 716 may directly communicate the compressed data to the profiler algorithm 717 (where the compressed data is further processed) and the compressed data (meta-data) may be subsequently communicated from the profiler algorithm 717 to the meta-database programing interface 714 along with parameters determined by instructions associated with the profiler algorithm 717.

The method 800 may include (see, e.g., method element 858) generating, utilizing the AI program, granular data types for at least a portion of the meta-data. In several embodiments, the profiler algorithm 717 may include one or more subprograms and/or be associated with instructions that, when implemented, generate the granular data types and associate such data types with the appropriate meta-data. In various embodiments, the profiler algorithm 717 may utilize an AI program(s) in order to determine at least a portion of the granular data types and/or sort or associate the meta-data with the appropriate granular data types. In some embodiments, suitable granular data types may represent, for example, types of devices associated with telephone numbers (e.g., landline, mobile phone, web-browser telephone application, local PC telephone application, etc.), different types of statistically significant profile distributions associated with portions of the metadata (e.g., Bernoulli distributions, uniform distributions, binomial distributions, normal distributions, Poisson distributions, exponential distributions, and the like), physical addresses; virtual locations or associations (e.g., an IP address, hash, email, etc.), names (e.g., first, last, middle, full, aliases, etc.), database element characteristics (e.g., signed floating point real numbers, zero-inflated signed floating point real numbers, integers, strings, etc.). While the above granular data types are provided for example, it should be appreciated that the granular data types may generally be determined or associated with characteristics of the source databases 702 and/or the future process 740.

Suitable AI programs for use with the profiler algorithm 717 may include one or more machine learning programs, neural networks, CNNs, support vector algorithms, deep neural networks, decision tree learning, associate rule learning, or a similar AI algorithm capable of establishing some or all of the granular data types and/or associate the meta-data with the appropriate granular data types. Additionally or alternatively, generating the granular data types and associated the meta-data with the same may include or be associated with instructions representing a field-by-field analysis. Additionally or alternatively, the instruction to generate granular data types for at least a portion of the data of the meta-database may include instructions to analyze properties of the data of the meta-database stored as at least one of integer, floating point, date, or text to detect at least one of categorical variables, binary variables, dates with and without times, timestamps with and without dates, numerically encoded categorical variables, true floating point and integer values, ID numbers, strings, zip codes, phone numbers, or IP addresses.

Method element 860 may include determining, utilizing the artificial intelligence program, a plurality of variables indicative of at least a portion of the data of the meta-database. In several embodiments, the profiler algorithm 717 may include one or more subprograms and/or be associated with instructions that, when implemented, generate the variables (variables depicted as triangles 726, 728, 730, 734) from the meta-data. Particularly, the identified variables are generally produced or linked from portions of the meta-data (associated with the data of source databases 702) having the most use for future processing, e.g., a reduction in the time required and/or computational power necessarily associated with running the future process 740. Thus, the system may indicate that source data 718, 720, 722, and 724 may be useful as part of the input to the future process 740. For instance, at least one of, such as all of source data 718, 720, 722, and 724 may include a superset of functional column types/data of the source databases 702 that are more useful to data scientists. Additionally or alternatively, the profiler algorithm 717 may be configured to generate a warning communication if the data associated with a variable categorized as important changes to a substantial degree, as compared to meta-data utilized to generate such variable previously.

In various embodiments, the profiler algorithm 717 may utilize an AI program(s) in order to determine at least a portion of the variables and/or sort or associate the meta-data with the appropriate variables. Suitable AI programs for use with the profiler algorithm 717 may include one or more machine learning programs, neural networks, CNNs, support vector algorithms, deep neural networks, decision tree learning, associate rule learning, or, similar AI algorithms capable of determining some or all of the variables and/or associate the meta-data with the appropriate variable(s).

For instance and as shown in FIG. 7, variable 728 may be determined from (e.g., may be the same value, approximately the same value, and/or the result of one or more operations performed) on meta-data 722 representing source data 722 of the source databases 702. Similarly, variable 730 may be determined from meta-data 724. With respect to variable 726, the profiler algorithm 717 may be configured to indicate one of source data 718 and 720, which may be heavily inter-correlated, are redundant for the purposes of determining variable 726. Such result may indicate to a user of the system 700 that source data 718 or source data 720 may be excluded from the future process 740 without substantially reducing the accuracy of the inference and/or training. Particularly, the elimination of redundant data in the input to the future process 740 may improve the efficiency of the same.

In some embodiments, the profiler algorithm 717 may be configured to indicate portions, fields, columns, etc. of the source databases that include blank entries, are missing entries, and/or contain data that is mostly incomplete. For example, the profiler algorithm 717 may be associated with instructions to collect information about the completeness of meta-data (e.g., meta-data 725 representing source data 725) relevant to a potential variable and, when the completeness of the meta-data is less than a predetermined threshold, eliminate the meta-data relevant to the potential variable from the meta-database 708. Thus, the profiler algorithm 717 may be configured to remove meta-data 725 (e.g., via the meta-database interface 714) from the meta-database. Thus, subsequent processes performed on the meta-database 708 may be faster or require less computational resources due to the reduction in elements of the meta-database.

In some embodiments, the profiler algorithm 717 may be configured to determine one or more combined variables, each combined variable representing data associated with two or more distinct variables. Particularly, various combined variables determined by the profiler algorithm 717 may require input from spate portions of the source database(s) 702 relevant to the distinct variables. In various embodiments, the profiler algorithm 717 may recognize when distinct meta-data variables are related from the training of the associated AI algorithm(s). As an example, variable 728 may represent data indicating or otherwise associated with a time zone, and variable 730 may represent data indicating or otherwise associated with a latitude within the United States. Based on prior training of the AI program(s), an inference may be produced identifying a state represented by the combination of variables (e.g., combined variable 734 of the meta-database 708 of FIG. 7). In a different situation, the source databases 702 may already include source data relevant to each of variables 728, 730, and 734. Thus, additionally or alternatively, the profiler algorithm 717 may be configured to produce one or more associations between variables. For example, the profiler algorithm 717 may identify relationship 736 between variable 728 and variable 734 and/or may identify relationship 738 between variable 730 and variable 734. For example, an AI program(s) associated with the profiler algorithm 717 may produce an inference of the association(s) 736, 738 based at least in part on adequate training of the model.

In some embodiments, an association produced between two or more variables (e.g., association 736 and/or association 738) represents or approximates a causal relationship between such variables. Such casual relationships may be determined between variables associated with a single source database 702 or data stored across multiple source databases 702. In some embodiments, determining such a causal relationship may include instructions associated with determining at least one parametric correlation between at least two variables, a non-parametric correlation between at least two variables, a Pearson correlation between at least two variables, a Spearman correlation between at least two variables, a Kendall's Tau correlation between at least two variables, mutual information between at least two variables, or an uncertainty coefficient between at least two variables. In some embodiments, an AI program(s) of the profiler algorithm 717 may be used in the process of determining a causal relationship between variables. For example, a deep neural network may be trained to determine or approximate such a causal relationship and/or coefficients for determining the same, such as some or all of the proceeding. It should be appreciated that the AI program may be capable of approximating the causal relationship and/or coefficients or parameters representing the relationship or used to establish the relationship faster and/or require less computing power than the traditional mathematical operations to determine the same. Thus, the profiler algorithm 717 may expedite representing or approximating causal relationships between variables of the meta-database 708 in a pre-processing stage. Other AI programs that may be used, at least in part, by the profiler algorithm 717 to determine casual relationships between variables include machine learning programs, neural networks, CNNs, support vector algorithms, decision tree learning, associate rule learning, or, similar AI algorithms suitable for producing causal inferences based on input data.

In some embodiments, the profiler algorithm 717 may generate a probability distribution for the meta-data associated with at least one variable, such as all of the variables identified by the profiler algorithm 717 and/or included in the meta-database 708. In some embodiments, the profiler algorithm 717 may utilize an appropriate AI program(s) in order to produce or approximate probability distributions for the meta-data associated with variable(s) of the meta-database. Additionally or alternatively, generating the probability distribution for each variable may be associated with instruction to apply a function of the granular data type for the variable, such as a function including at least one of a density estimate, discrete distribution, or sample.

As shown in FIG. 8, method element 866 may include communicating, to the meta-database programing interface, the compressed data and modifying the meta-database to include the probability distribution generated for each variable and the at least one association produced between the at least two variables. For example, the profiler algorithm 717 may communicate the meta-data to the meta-database interface 714 to update the meta-data. More particularly, the meta-database interface 714 may alter the meta-data to reflect any changes that are indicated by the profiler algorithm 717. For example, mostly empty meta-data 725 may be removed from the meta-database 708 (see crossed-out circles 725 at the bottom, left of FIG. 7). In some embodiments, the profiler algorithm 717 may be configured to communicate to the meta-database interface 714 any variables, associations between variables, probability distributions, casual relationships, and the like determined using the steps associated with the profiler algorithm 717.

As shown in FIG. 7, the system 700 may include the key interface program (key interface 732) associated with instructions allowing a user to search the meta-database 708 for at least one of a variable, a probability distribution for a variable, or a produced association between variables. In some embodiments, a user may be able to alter the source databases 702 available to the KVR module 710 module for processing or specify portionS, columns, etc. of source databases 702 to summarize and other portions to exclude. Thus, key interface 732 may be communicatively coupled to the KVR module 710 in order to communicate and/or alter such parameters. Further, the key interface 732 may communicate a signal or otherwise cause system 700 to implement the scanner algorithm 716 and/or profiler algorithm 717 with the user specified parameters.

Generally, a user may interact and/or enter search queries within the key interface 732 and receive information indicating where data relevant to such queries are stored in the source databases 702. For example, a user may review the variables identified by the KVR module 710 and input a variable(s) of interest. The key interface 732 may be configured (e.g., via associated computer implementable instructions) to indicate a subset of the source databases 702 and or portions of the same including data relevant to the variable(s) of interest. In some embodiments, the key interface 732 may execute instructions to produce one or more interactive visualizations of the meta-data indicative of the variable(s) of interest, the association(s) between variables of interest, and/or the probability distribution of the variable(s) of interest. In some embodiments, the key interface 732 may be configured to receive weight coefficients from the user in order to alter the visual representation produced by the key interface 732 and/or associated instruction implemented by the same. For example, a user may increase a gain in order to better visualize certain parameters.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for maintaining a meta-database representing data from a plurality of source databases, the system comprising:

a computer including one or more processor and at least one of a memory device and a non-transitory storage device, wherein the one or more processor executes:
  a source programing interface configured for interfacing with the plurality of source databases, the plurality of source databases including data associated with a plurality of variables, wherein a decentralized storage of the data results in inefficient selection of at least one of data or variables for modeling;
  a meta-database programming interface configured for interfacing with the meta-database;
  a key variable repository module configured to operably couple the plurality of source databases and the meta-database, the key variable repository module including an artificial intelligence program comprising:
a scanner algorithm configured to perform steps including:
  communicate with the source programing interface to receive the data of the source databases;
  compress the data of the source databases;
  communicate with the meta-database programing interface and synchronize the meta-database with the compressed data of the source databases;
a profiler algorithm configured to perform steps including:
  communicate with the meta-database programing interface to receive the data of the meta-database;
  generate, based on the data of the meta-database, granular data types for at least a portion of the data of the meta-database;
  determine a plurality of variables indicative of at least a portion of the data of the meta-database and generate, for each variable, a probability distribution;
  produce at least one association between at least two variables of the plurality of variables; and
  communicate with the meta-database programing interface to modify the meta-database to include the probability distribution generated for each variable and the at least one association produced between the at least two variables; and
a key interface configured to allow searching the meta-database for at least one of a variable, a probability distribution for a variable, or a produced association between variables, wherein at least one of the meta-database or the key interface improves the efficiency in the selection of at least one of data or variables for modeling.

2. A system for maintaining a meta-database representing data from a plurality of source databases, the system comprising:
  a computer including one or more processor and at least one of a memory device and a non-transitory storage device, wherein the one or more processor executes artificial intelligence computer-readable instructions to:
    receive data representative of the plurality of source databases;
    identify a representative set of data for each source database of the plurality of source databases, wherein each set of data represents the data of the respective source database;
    generate, in the meta-database, the representative data sets for the plurality of source databases;
    generate granular data types for at least a portion of the representative data sets of the meta-database;
    determine a plurality of variables indicative of at least a portion of the data of the meta-database;
    generate a probability distribution for each variable of the plurality of variables; and
    based at least in part on the granular data types and the probability distribution for each variable, produce at least one association between at least two variables of the plurality of variables.

3. The system of claim 2, wherein at least one of the steps to identify the representative set of data for each source database, to generate granular data types for at least a portion of the data of the meta-database, to determine the plurality of variables indicative of at least a portion of the data of the meta-database, or to produce at least one association between at least two variables are included in instructions associated with a machine learning algorithm.

4. The system of claim 3, wherein the machine learning algorithm uses a neural network.

5. The system of claim 2, wherein the one or more processor further executes instructions to:
  generate, in the meta-database, the probability distribution generated for each variable and the at least one association between the at least two variables.

6. The system of claim 5, wherein the one or more processor further executes instructions to:
  search, based on a user input, the data of the meta-database for at least one variable, probability distributions for at least one variable, or associations between at least two variables.

7. The system of claim 5, wherein the one or more processor further executes instructions to:
  search, based on a user input, a subset of the data of the meta-database for at least one variable, a probability distribution for at least one variable, or an association between at least two variables,
  wherein the subset of data represents a subset of databases of the plurality of source databases.

8. The system of claim 2, wherein the one or more processor further executes instructions to:
  produce at least one interactive visualization of at least one variable of the plurality of variables, a probability distributions for at least one variable, or an association between at least two variables.

9. The system of claim 2, wherein the one or more processor further executes instructions to:
  communicate, based on at least one variable identified by a user, a subset of the plurality of source databases including data relevant to the at least one variable identified by the user.

10. The system of claim 2, wherein the instruction to identify the representative data for each database of the plurality of source databases includes instructions to:
  compress the data represented in each source database of the plurality of source databases.

11. The system of claim 2, wherein the instruction to generate, in the meta-database, the representative data for the plurality of source databases includes instructions to:
  synchronize the data of meta-database with the representative data for the plurality of source databases.

12. The system of claim 2, wherein the one or more processor further executes instructions to:
  collect information about the completeness of data relevant to a variable and, when the completeness of the data is less than a predetermined threshold, eliminates the data relevant to the variable from the meta-database.

13. The system of claim 2, wherein the instruction to generate granular data types for at least a portion of the data of the meta-database includes utilizing a field-by-field analysis.

14. The system of claim 2, wherein the instruction to generate granular data types for at least a portion of the data of the meta-database includes instructions to:
    analyze properties of the data of the meta-database stored as at least one of integer, floating point, date, or text to detect at least one of categorical variables, binary variables, dates with and without times, timestamps with and without dates, numerically encoded categorical variables, true floating point and integer values, ID numbers, strings, zip codes, phone numbers, or IP addresses.

15. The system of claim 2, wherein the instruction to generate a probability distribution for each variable of the plurality of variables includes instructions to:
    apply a function of the granular data type for at least one variable, the function including at least one of a density estimate, discrete distribution, or sample.

16. The system of claim 2, wherein the instruction to produce at least one association between at least two variables includes instructions to:
    determine or estimate a causal relationship between the at least two variables.

17. The system of claim 2, wherein the instruction to produce at least one association between at least two variables includes instructions to:
    determine or estimate at least one of a parametric correlation between the at least two variables, a non-parametric correlation between the at least two variables, a Pearson correlation between the at least two variables, a Spearman correlation between the at least two variables, a Kendall's Tau correlation between the at least two variables, mutual information between the at least two variables, or an uncertainty coefficient between the at least two variables.

18. The system of claim 2, wherein the meta-database is stored on a first portion of the at least one of the memory device and the non-transitory storage device, and the plurality of source databases is stored on a second portion of the at least one of a memory device and a non-transitory storage device, and wherein the first portion is allocated to substantially less memory space of the at least one of a memory device and a non-transitory storage device than the second portion.

19. A method for maintaining a meta-database representing a plurality of source databases, the method comprising:
    communicating, from a source programing interface, data representative of a plurality of source databases to an artificial intelligence program;
    compressing the data representative of the plurality of source databases;
    communicating, to a meta-database programing interface, the compressed data and synchronizing the data of the meta-database with the compressed data resulting in synchronized data;
    generating, utilizing the artificial intelligence program, granular data types for at least a portion of the synchronized data of the meta-database;
    determining, utilizing the artificial intelligence program, a plurality of variables indicative of at least a portion of the synchronized data of the meta-database;
    generating, utilizing the artificial intelligence program, a probability distribution for each variable of the plurality of variables;
    based at least in part on the granular data types and the probability distribution for each variable, producing, utilizing the artificial intelligence program, at least one association between at least two variables of the plurality of variables; and
    communicating, to the meta-database programing interface, the compressed data and modifying the meta-database to include the probability distribution generated for each variable and the at least one association produced between the at least two variables.

20. The method of claim 19, further comprising: determining, utilizing the artificial intelligence program and the plurality of source databases, that at least a portion of the data of the meta-database is outdated.

* * * * *